United States Patent
Choi

(10) Patent No.: US 7,516,345 B2
(45) Date of Patent: Apr. 7, 2009

(54) INTERFACE DEVICE FOR PERIPHERALS AND PRIORITY CONTROL METHOD THEREOF

(75) Inventor: Ho-joong Choi, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 34 days.

(21) Appl. No.: 10/460,169

(22) Filed: Jun. 13, 2003

(65) Prior Publication Data

US 2003/0233499 A1 Dec. 18, 2003

(30) Foreign Application Priority Data

Jun. 14, 2002 (KR) .................. 10-2002-0033404

(51) Int. Cl.
*G06F 1/32* (2006.01)
*G06F 1/26* (2006.01)
*G06F 3/00* (2006.01)
*G06F 3/06* (2006.01)
*G06F 5/00* (2006.01)
*G06F 13/00* (2006.01)
*G06F 13/36* (2006.01)
*G06F 13/38* (2006.01)

(52) U.S. Cl. ............... 713/323; 713/300; 713/320; 713/324; 713/340; 710/11; 710/14; 710/15; 710/16; 710/18; 710/38; 710/62; 710/64; 710/72; 710/74; 710/105; 710/305; 710/306; 710/315; 710/316

(58) Field of Classification Search ............ 710/2, 710/8, 10, 11, 14–19, 38, 62–64, 72–74, 710/100, 104, 105, 300–303, 305, 306, 313, 710/315, 316; 713/300, 320, 323, 324, 340, 713/1, 100
See application file for complete search history.

(56) References Cited

U.S. PATENT DOCUMENTS

| | | | |
|---|---|---|---|
| 5,922,062 A | 7/1999 | Evoy | 710/729 |
| 6,212,633 B1* | 4/2001 | Levy et al. | 713/153 |
| 6,336,155 B1* | 1/2002 | Ito et al. | 710/37 |
| 6,356,968 B1 | 3/2002 | Kishon | |
| 6,380,767 B1* | 4/2002 | Nyu et al. | 327/108 |
| 2001/0036227 A1* | 11/2001 | Matsuo et al. | 375/224 |
| 2002/0105977 A1* | 8/2002 | Masunaga et al. | 370/519 |
| 2003/0115413 A1* | 6/2003 | Wood et al. | 711/114 |

FOREIGN PATENT DOCUMENTS

EP 1 111 498 A2 6/2001

(Continued)

OTHER PUBLICATIONS

Translation of Korean Document No. 20-230770 published Jul. 19, 2001.*
Japanese Abstract 1999-175206, Jul. 2, 1999.
Notice to Submit Response, from Korean Patent Office, dated Mar. 2, 2004.

(Continued)

*Primary Examiner*—Tanh Q Nguyen
(74) *Attorney, Agent, or Firm*—Staas & Halsey LLP

(57) ABSTRACT

A peripheral interface device includes a plurality of ports, each of which supports corresponding ones of first interface methods; a plurality of interface converters each connected to respective ports, and converting a first signal of the corresponding ones of the first interface methods from the corresponding ports into a second signal of a second interface method; and a port selection unit supplying power to one of the interface converters and cutting off the power from an other one of the interface converters to selectively operate the interface converters.

6 Claims, 6 Drawing Sheets

FOREIGN PATENT DOCUMENTS

| | | |
|---|---|---|
| JP | 04-101258 | 4/1992 |
| JP | 11-175206 | 7/1999 |
| JP | 2002-140140 | 5/2002 |
| JP | 2003-233579 | 8/2003 |
| KR | 20-230770 | 7/2001 |
| WO | WO 99/48014 | 9/1999 |

OTHER PUBLICATIONS

Japanese Office Action dated Jan. 26, 2006 for Japanese Application No. 2003-169224.

* cited by examiner

INTERFACE DEVICE FOR PERIPHERALS AND PRIORITY CONTROL METHOD THEREOF

CROSS-REFERENCE TO RELATED APPLICATIONS

This application claims the benefit of Korean Patent Application No. 2002-33404, filed Jun. 14, 2002, in the Korean Intellectual Property Office, the disclosure of which is incorporated herein by reference.

BACKGROUND OF THE INVENTION

1. Field of the Invention

The present invention relates to a peripheral interface device, and more particularly, to a peripheral interface device capable of supporting a plurality of interfaces, and a priority control method thereof.

2. Description of the Related Art

With development of information communications equipment, a variety of interface methods have been introduced, for example, Institute of Electrical and Electronics Engineers 1394 (IEEE1394), a universal serial bus (USB), a universal asynchronous receiver/transmitter (UART), a recommended standard 232 revision C (RS232C), etc. Among them, the IEEE1394 and the USB are widely employed in a computer as the interface methods.

Meanwhile, there is no limit to the number of peripherals that can be connected to the computer while the number of ports provided in the computer is limited. Accordingly, it is possible that a peripheral device can support the interface methods.

For example, a hard disc drive that is a representative computer peripheral device offers a capacity of tens of gigabytes today, and utilization of the hard disc drive continues to expand. Also, to increase mobility, portable hard disc drives have been introduced.

At present, an Intel-compatible computer supports 2 (two) hard disc drive buses, each of which can connect 2 hard discs disc drives (master and slave). Considering that 1 or 2 CD-ROM drives (or DVD-ROM drives) and 1 CD-RW drive are normally used, only 2 hard disc drives can be connected through the hard disc drive buses, and it is difficult to connect more than two hard disc drives.

Accordingly, the hard disc drives supporting multiple interface methods (interfaces), such as the IEEE1394 and the USB, are being introduced.

These hard disc drives supporting the multiple interfaces have a plurality of bridges (a bridge converts a signal of an interface method into a signal of another interface method) and selectively use one of the bridges. For example, a USB/integrated drive electronics (USB/IDE) bridge converts a signal of a USB interface method into a signal of an IDE interface that is a standard for a hard disc drive.

The hard disc drives supporting these multiple interfaces may be divided by a direct connection method and a multiplexer-using method.

A hard disc drive of the direct connection method has connection ports corresponding to respective interface methods and bridges connected to the respective connection ports. Which bridge is to be used is determined only by selection of a user.

A hard disc drive of the multiplexer-using method has connection ports corresponding to respective interface methods and bridges connected to the respective connection ports. Using a multiplexer, one of signals converted in bridges appropriate to respective interface methods is selectively used.

However, the hard disc drive of the direct connection method can neither identify the interface method nor correctly respond to an interface when 2 or more interfaces using different interface methods are connected to the computer, such that the interfaces cause defects or troubles in operation.

Also, in the hard disc drive of the multiplexer-using method, power is provided not only to a bridge being used but also to other bridges, which are not in use, such that other bridges also operate to cause noise and a waste of the power, and use of the multiplexer puts an obstacle to minimization of an external or portable hard disc drive.

As shown in FIG. 1, a hard disc drive of a conventional direct connection method includes an IEEE1394 port 102 to which an IEEE1394 connector can be connected, an IEEE1394 physical layer processor (PHY) 104 which processes a physical layer of an IEEE1394 signal, an IEEE1394/IDE bridge 106 which processes a link layer of the IEEE1394 signal, a USB port 108 to which a USB connector can be connected, a USB/IDE bridge 110 which processes a physical layer and a link layer of a USB signal, and an advanced technology attachment packet interface (ATAPI) bus connector 112.

In the hard disc drive shown in FIG. 1, a user selectively uses only one of the IEEE1394 port 102 and the USB port 108.

However, since in the hard disc drive of FIG. 1, the IEEE1394 physical layer processor 104, the IEEE1394/IDE bridge 106, and the USB/IDE bridge 110 always operate, if one method is used, a bridge of the other method wastes power and may cause noise into an ATAPI signal.

Also, if both the IEEE1394 port 102 and the USB port 108 are connected to the IEEE 1394 port 102 and the USB port 108, respectively, by mistake, the hard disc drive may not work properly.

FIG. 2 is a diagram showing another structure of another conventional portable hard disc drive that uses a multiplexer-using method.

As shown in FIG. 2, the hard disc drive of the conventional multiplexer-using method includes an IEEE1394 port 202 to which an IEEE1394 connector can be connected, an IEEE1394 physical layer processor 204 which processes a physical layer of an IEEE1394 signal, an IEEE1394/IDE bridge 206 which processes a link layer of the IEEE1394 signal; a USB port 208 to which a USB connector can be connected, a USB/IDE bridge 210 which processes a physical layer and a link layer of a USB signal, a multiplexer/demultiplexer 214 which selectively outputs one of outputs of the IEEE1394/IDE bridge 206 and the USB/IDE bridge 210, and an ATAPI bus connector 212.

In the hard disc drive of FIG. 2, an operation of the multiplexer/demultiplexer 214 is controlled by a signal provided to the USB port 208. A USB connector includes a power pin (Vp), a ground pin (GROUND), and 2 differential signal pins (D, D2). A selection operation of the multiplexer/demultiplexer 214 is controlled by USB power (Vusb) provided to the power pin (Vp). That is, if the USB power (Vusb) is provided, the multiplexer/demultiplexer 214 operates to connect the USB/IDE bridge 210 to the ATAPI bus connector 212 while if the USB power (Vusb) is not provided, the IEEE1394/IDE bridge 206 is connected to the ATAPI bus connector 212.

By the operation of the multiplexer/demultiplexer 214, when both the IEEE1394 port 102 and the USB port 108 are connected, the hard disc drive of FIG. 2 appropriately determines the interface method being used and responds to it.

However, also in the hard disc drive of FIG. 2 like as in the hard disc drive of FIG. 1, the IEEE1394 physical layer processor 204, the IEEE1394/IDE bridge 206, and the USB/IDE bridge 210 always operate even if one method is used, and the bridge of the other method wastes the power and may cause the noise into the ATAPI signal.

Meanwhile, since the multiplexer/demultiplexer 214 should correspond to the number of IDE-type signal lines, it is difficult to minimize a size of the portable hard disc drive, and a switching operation may cause noise.

SUMMARY OF THE INVENTION

To solve the above and/or other problems, it is an aspect of the present invention to provide a peripheral interface device which supports a plurality of interface methods and can control a priority among peripherals when the peripherals are connected through 2 or more interface ports.

Also, to solve the above and/or other problems, it is another aspect of the present invention to provide a priority control method appropriate to an interface device.

Additional aspects and advantages of the invention will be set forth in part in the description which follows and, in part, will be obvious from the description, or may be learned by practice of the invention.

According to an aspect of the present invention, a peripheral interface device includes a plurality of ports, a plurality of interface converters, a priority determining unit, a port selection unit, and a connection unit. The ports receive first signals appropriate to a plurality of interface methods. The interface converters are connected to respectively appropriate ports and converts the first signals of interface methods corresponding to the ports into second signals of interface methods appropriate to a hard disc drive. The priority determining unit receives the first signals of respective interface methods from the ports, identifies a method of a connected interface, and when two or more interfaces are connected to the ports, determines a priority among the interfaces. The port selection unit, according to a result of identification by the priority control unit, controls supply of power in order to selectively operate the interface converters.

According to another aspect of the present invention, a priority control method of a peripheral interface device includes at least two ports, each of which supports one interface method, and two interface converters which are connected to respectively appropriate ports and convert first signals of interface methods corresponding to the ports into second signals of the interface methods appropriate to a peripheral device. A priority between the two ports is read. Based on read priority setting, it is determined whether a high priority port, e.g., one of the ports, is connected to one of the interfaces. If the higher priority port is connected, the higher priority port is selected, and power provided to a converter corresponding to a remaining lower priority port is cut off. If the higher priority port is not connected to the one of the interfaces, and it is determined that a lower priority port, e.g., the other one of the ports, is connected to the other one of the interfaces, the lower priority port is selected, and power is provided to the other one of the interface converters corresponding to the lower priority port but is not provided to the one of the interface converters corresponding to the higher priority port to cut off power from the other one of the interface converters.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
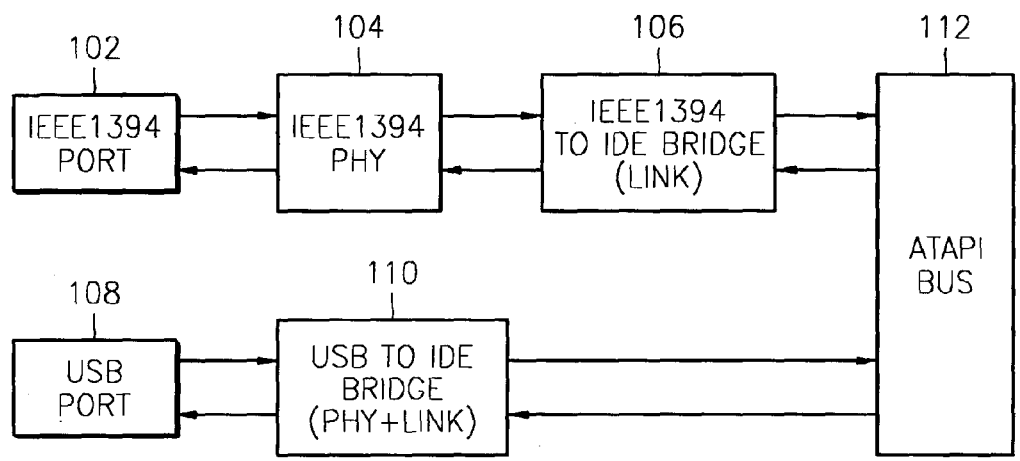
FIG. 1 is a diagram showing a structure of a conventional portable hard disc drive.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 2:
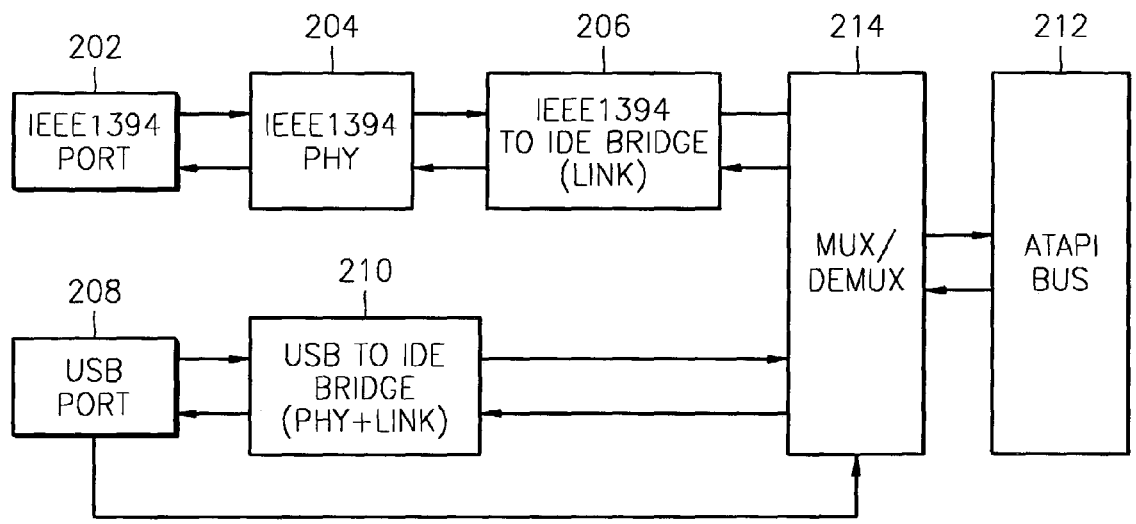
FIG. 2 is a diagram showing another structure of another conventional portable hard disc drive.
Figure 3:
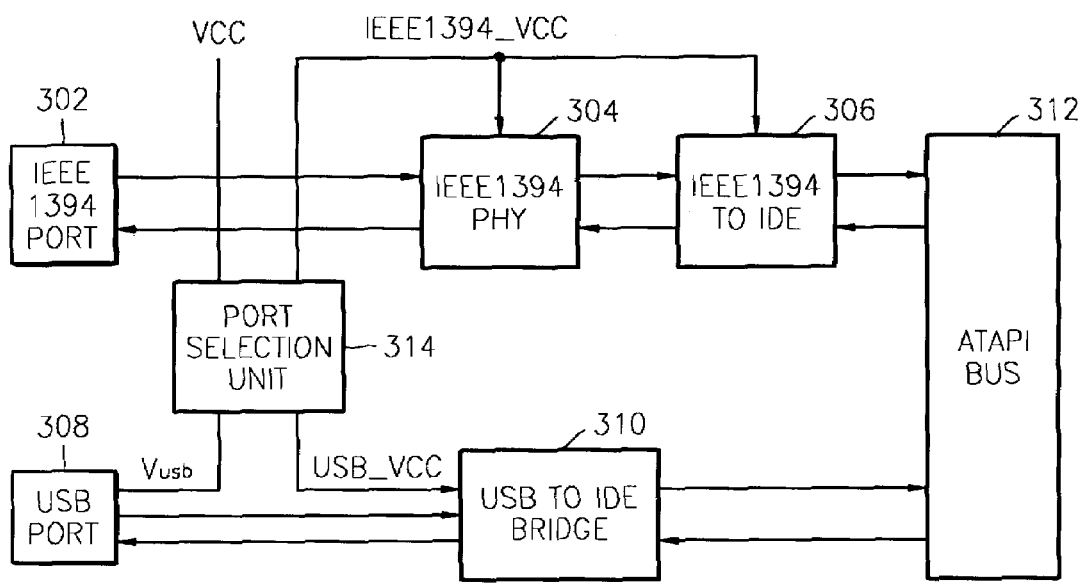
FIG. 3 is a block diagram showing a structure of a peripheral interface device according to an embodiment of the present invention.

FIG. 3 is a block diagram showing a structure of a peripheral interface device according to an embodiment of the present invention which is applied to a hard disc drive. Compared to a device of FIG. 2, the peripheral interface device does not use a multiplexer/demultiplexer, and controls a power supply to selectively operate the IEEE1394/IDE bridge 106 and a USB/IDE bridge 110.

The device shown in FIG. 3 includes an IEEE1394 port 302 to which an IEEE1394 connector can be connected, an IEEE1394 physical layer processor 304 which processes a physical layer of an IEEE1394 signal, an IEEE1394/IDE bridge 306 which processes a link layer of the IEEE1394 signal, a USB port 308 to which a USB connector can be connected, a USB/IDE bridge 310 which processes a physical layer and a link layer of a USB signal, a port selection unit 314 which controls operations of the IEEE1394 physical layer processor 304, the IEEE1394/IDE bridge 306, and the USB/IDE bridge 310, and an ATAPI bus connector 312.

In the device of FIG. 3, an operation of the port selection unit 314 is controlled by a signal provided to the USB port 308. That is, if USB power (Vusb) is provided, the port selection unit 314 controls so that an operation power IEEE1394_VCC is not provided to the IEEE1394 physical layer processor 304 and the IEEE1394/IDE bridge 306, and another operation power USB_VCC is provided to the USB/IDE bridge 310. Accordingly, when the device shown in FIG. 3 is connected through the USB port 310, only the USB/IDE bridge 310 operates while the IEEE1394 physical layer processor 304 and the IEEE1394/IDE bridge 306 do not operate. Therefore, the possibility that noise is caused by the IEEE1394/IDE bridge 306 is removed.

Meanwhile, if the USB power (Vusb) is not provided (that is, when the device is connected through an IEEE port), the port selection unit 314 controls so that operation power IEEE1394_VCC is provided to the IEEE1394 physical layer processor 304 and the IEEE1394/IDE bridge 306, and the operation power USB_VCC is not provided to the USB/IDE bridge 310. Accordingly, when the device of FIG. 3 is connected through the IEEE1394 port 302, the IEEE1394 physical layer processor 304 and the IEEE1394/IDE bridge 306 operate, while the USB/IDE bridge 310 does not operate. Therefore, the possibility that noise is caused by the USB/IDE bridge 310 is removed.

In addition, since the device shown in FIG. 3 does not use a multiplexer/demultiplexer 214 of the device of FIG. 2, the device, if applied to a portable hard disc drive, helps to reduce a size of the portable hard disc drive.

Figure 4:
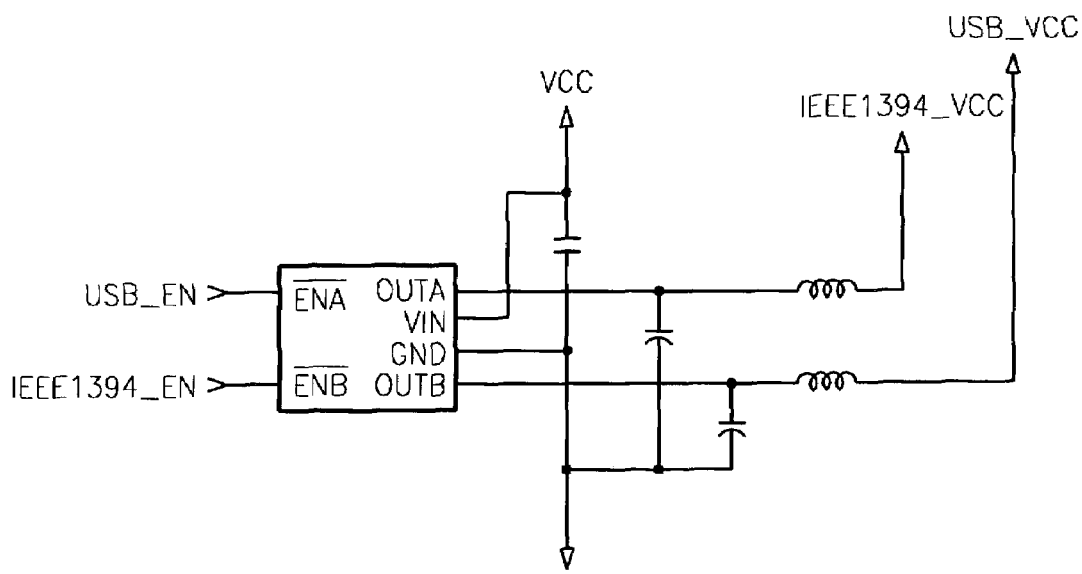
FIG. 4 is a circuit diagram showing a detailed structure of a port selection unit shown in FIG. 3.

FIG. 4 is a circuit diagram showing a detailed structure of the port selection unit 314 shown in FIG. 3.

The post selection unit 314 shown in FIG. 4 receives two inputs ($\overline{ENA}$, $\overline{ENB}$) that are complementary to each other, and according to states and operation modes (active low, high), generates outputs that are incompatible (OUTA, OUTB). Here, an operation mode is "active low", OUTA corresponds to IEEE1394 operation power (IEEE1394_VCC), and OUTB corresponds to USB operation power (USB_VCC).

For example, if $\overline{ENA}$ and $\overline{ENB}$ are logic 0 and logic 1, respectively, OUTA=VIN is output, while OUTB is not output. To the contrary, if $\overline{ENA}$ and $\overline{ENB}$ are logic 1 and logic 0, respectively, OUTA is not output, while OUTB=VIN is not output.

Figure 5:
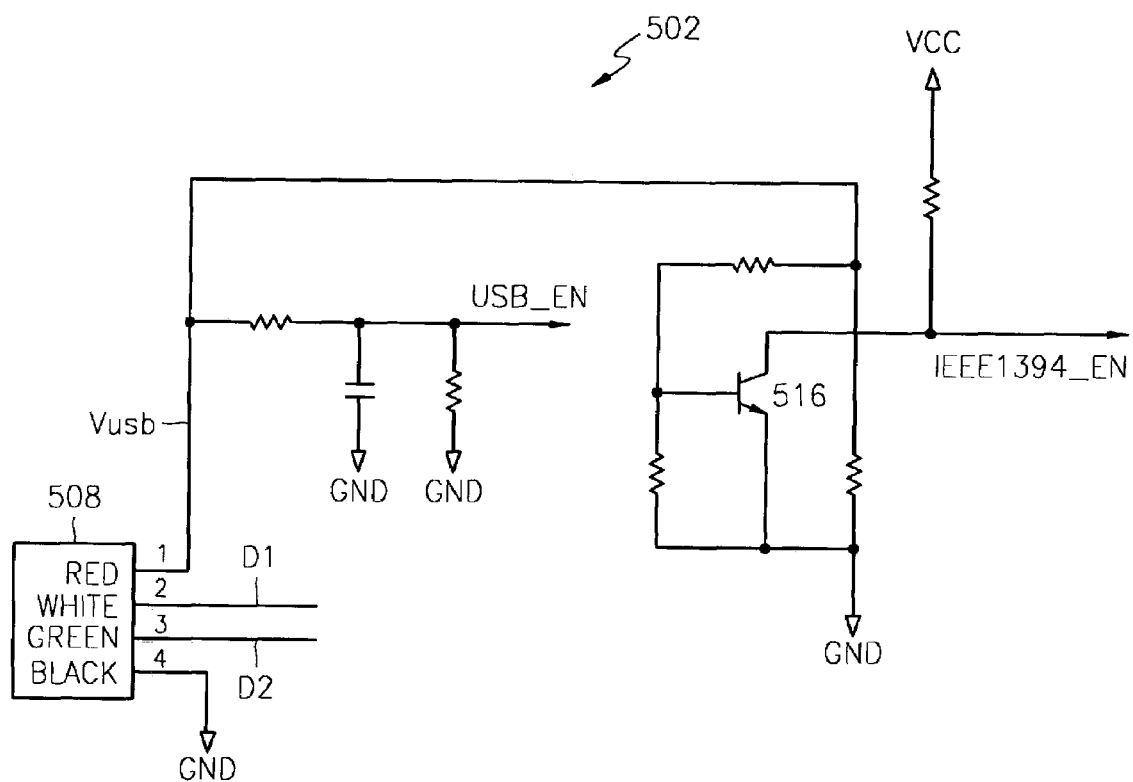
FIG. 5 is a diagram of a structure of a buffer generating complementary signals (USB_EN, 1394_EN) that are input to the port selection unit shown in FIG. 4.

FIG. 5 is a diagram of a structure of a buffer generating complementary signals (USB_EN, IEEE 1394_EN) that are input to the port selection unit 314 shown in FIG. 4. If Vusb is provided, USB_EN becomes 1, a transistor 516 short-circuits, and IEEE1394_EN=0 is output. To the contrary, if Vsub is not provided, USB_EN becomes 0, the transistor 516 is open, and IEEE1394_EN=1 is output.

By the operation of the port selection unit 314, a priority between the USB interface method and the IEEE1394 interface method is established. That is, when both the IEEE1394 port 302 and the USB port 308 are connected, only the USB port 308 is used so that abnormal operations and troubles can be prevented.

In the device shown in FIG. 3, the priority between the USB interface method and the IEEE1394 interface method can be changed. The change of the priority is performed when an IEEE1394 type power signal (V1394) instead of a USB type power signal (Vusb) is provided to the port selection unit 314.

The device shown in FIG. 3 is applied to the interface using only the IEEE1394 bus and the USB bus. However, the device shown in FIG. 3 can be easily extended also when more than two interface methods are used.

Figure 6:
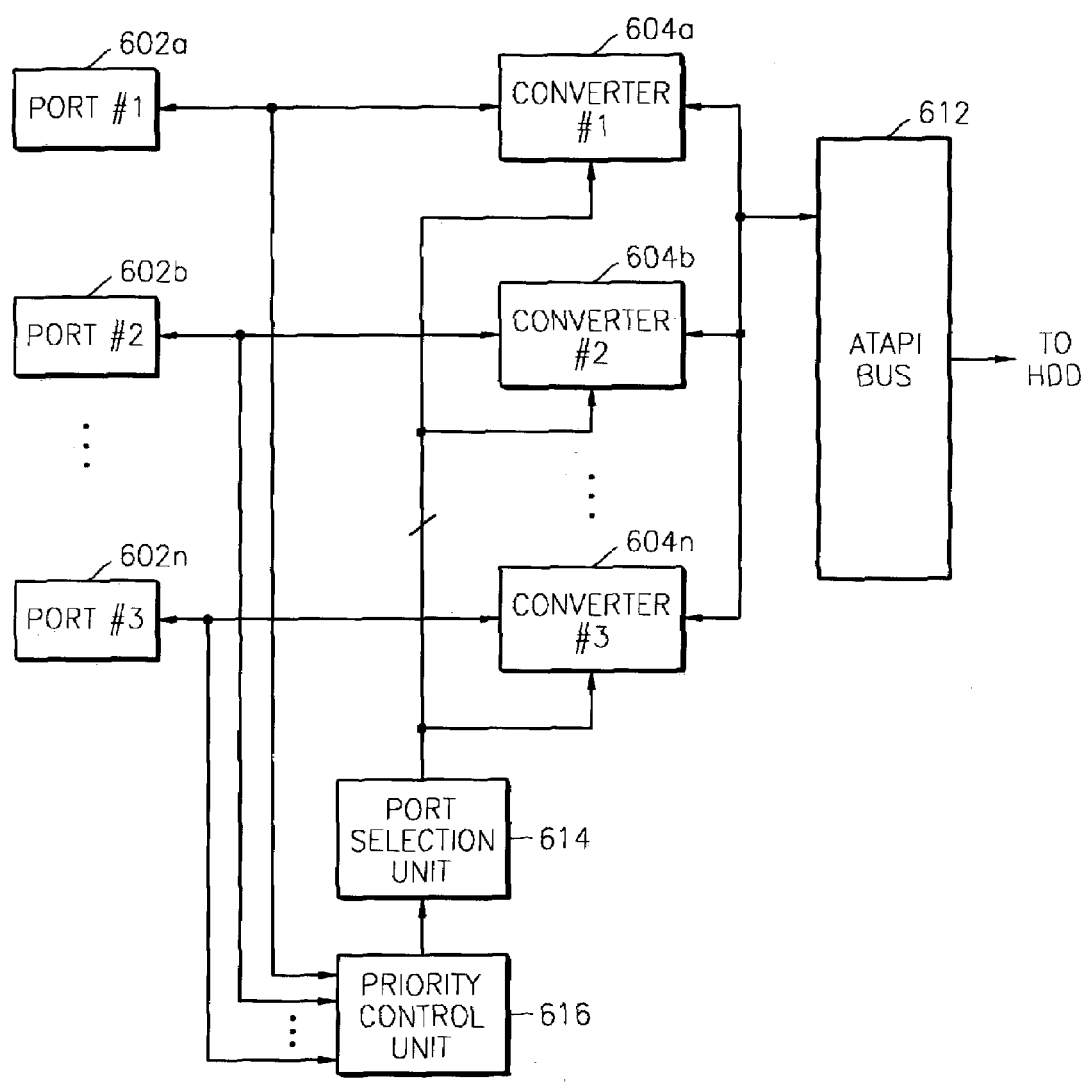
FIG. 6 is an exemplary block diagram of a structure of another peripheral interface device having a plurality of interface types according to another embodiment of the present invention.

FIG. 6 is an exemplary block diagram of a structure of another peripheral interface device applied to multiple interface types according to another embodiment of the present invention.

The device shown in FIG. 6 includes a plurality of ports 602a through 602n appropriate to the multiple interface types, converters 604a through 604n that are connected to respective ports and appropriate to the multiple interface methods, a port selection unit 614 which controls an operation power of each converter 604a through 604n, a priority control unit 616, and an ATAPI bus connector 612.

The ports 602a through 602n may be, for example, IEEE1394 ports to which IEEE1394 connectors can be connected, or USB ports to which USB connectors can be connected.

The converters 604 may be, for example, an IEEE/IDE converter having an IEEE1394 physical layer processor which processes a physical layer of an IEEE1394 signal, and an IEEE1394/IDE bridge which processes a link layer of the IEEE1394 signal, or a USB/IDE converter having a USB/IDE bridge.

The priority control unit 616 receives signals of multiple interface methods, and generates an identification signal indicating which one of the multiple interface methods is used. Also, when two or more signals are received, the priority control unit 616 determines a priority among the signals according to a predetermined priority, and generates an identification signal corresponding to the priority.

The port selection unit 614 generates power corresponding to the provided identification signal. At this time, other powers enter in a disabled state.

By operations of the priority control unit 616 and the port selection unit 614, the priority between the multiple interface methods is established. That is, when two or more interface methods are used through two or more ports, only one interface method among them is used so that abnormal operations and troubles are prevented.

Figure 7:
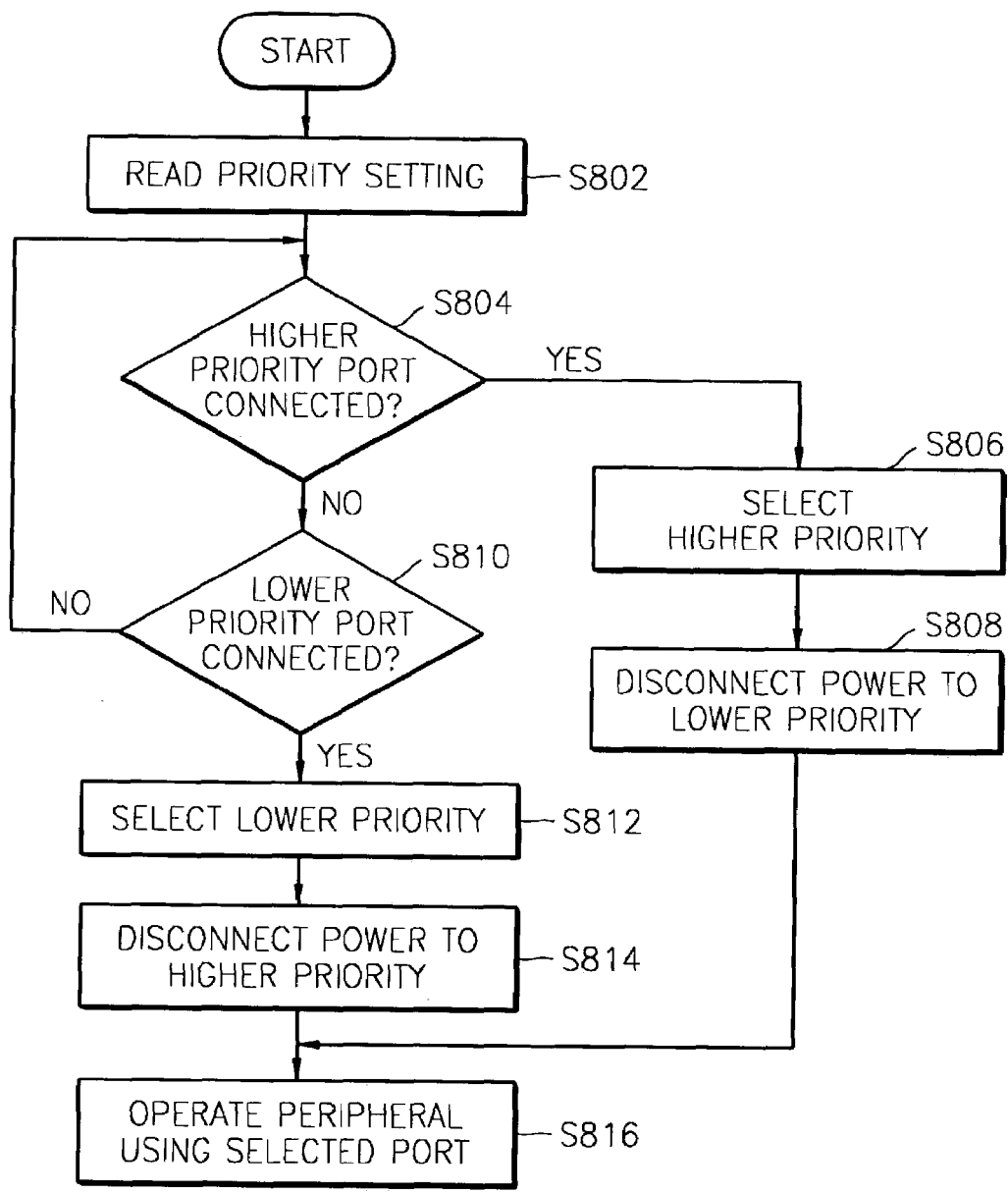
FIG. 7 is a flowchart showing a peripheral interface method according to another embodiment of the present invention.

FIG. 7 is a flowchart showing a peripheral interface method according to another embodiment of the present invention.

According to the peripheral interface method shown in FIG. 7, in a peripheral interface device having two interface ports as shown in FIG. 2, based on a preset priority, only one interface port is selected and the other interface port is disabled. In order to disable the other one of the interface ports corresponding to one of the interfaces of FIG. 2, an operation of a converter corresponding to the other one of the interface ports which is not selected is disabled, and more specifically, power of the converter is cut off to disable the other one of the interface ports.

First, priority setting is read in operation S802. The priority is set, for example, as USB->IEEE1394. Based on the read priority setting, it is determined whether a higher priority port is connected in operation S804. If the higher priority port is connected in operation S804, the higher priority port is selected in operation S806. The power that is provided to the converter corresponding to the remaining lower priority port is cut off in operation S808.

If the higher priority port is not connected in operation S804, it is determined whether a lower priority port is connected in operation S810. If the lower priority port is not connected, either, the operation S802 is performed. If the lower priority port is connected, the lower priority port is selected in operation S812. The power which is provided to the converter corresponding to the remaining higher priority port, is cut off in operation S814. Using the selected port, the peripheral device is operated in operation S816.

The method shown in FIG. 7 can be easily applied to the interface device having a plurality of interface ports as shown in FIG. 6. Here, the operations S808 and S812 are modified to cut off the power provided to converters corresponding to the remaining ports except the selected port, and the operation S810 is also modified so that if a next higher priority port is not connected, it is determined whether a second next higher priority port is connected.

Figure 8:
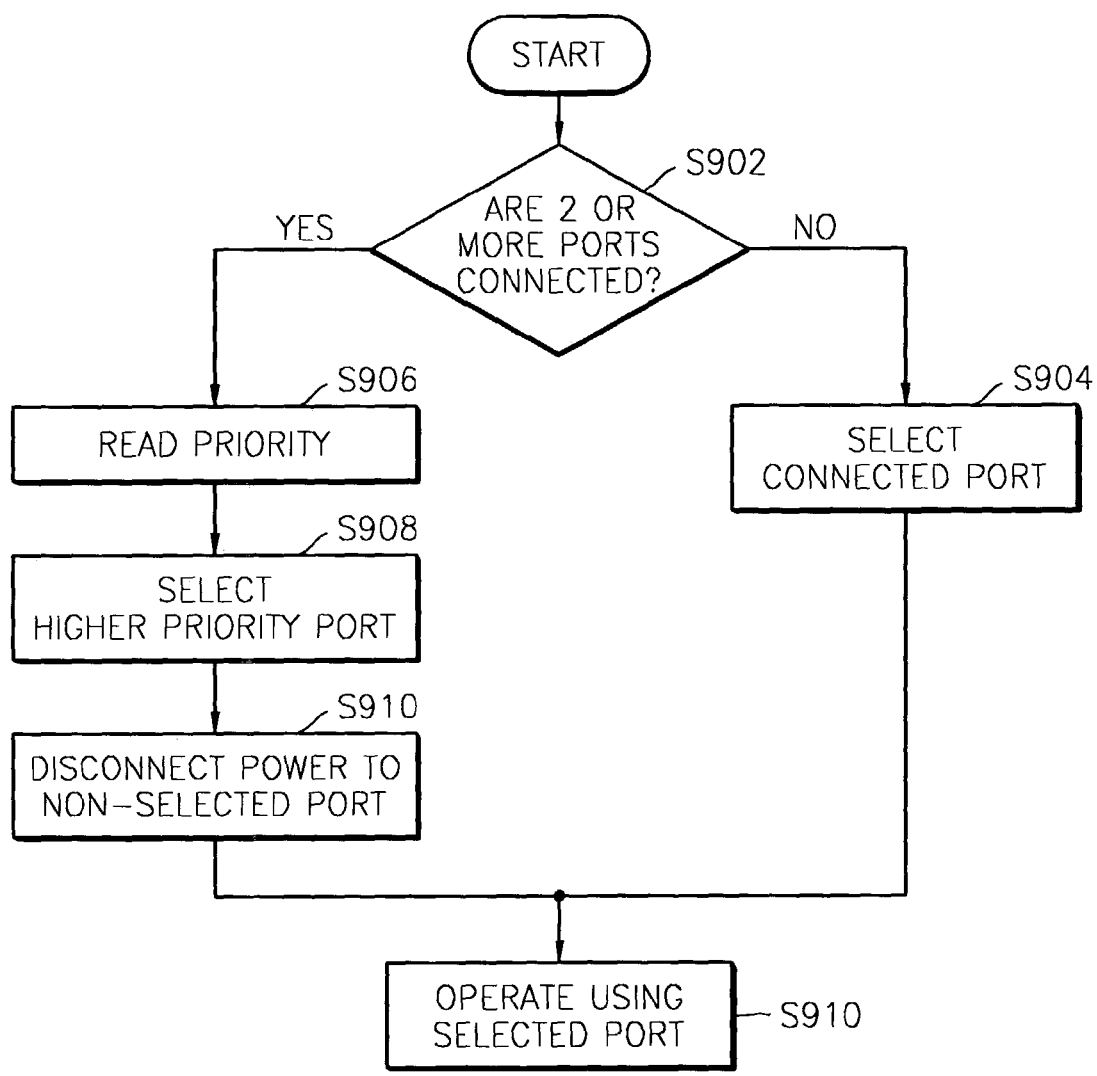
FIG. 8 is a flowchart showing another peripheral interface method according to another embodiment of the present invention.

FIG. 8 is a flowchart showing another peripheral interface method according to another embodiment of the present invention.

According to the peripheral interface method shown in FIG. 8, in the peripheral interface device having two or more interface ports as shown in FIG. 6, an interface port having a highest priority is selected among the interface ports according to priority setting, and other ports are disabled. In order to disable the interfaces of FIG. 6, operations of the converters corresponding to the interface ports which are not selected are disabled, and more specifically, the power of the converters are cut off to disable the interfaces.

First, it is determined whether two or more ports are connected in operation S902. If only one port is connected, the connected port is selected in operation S904. That is, operation power is provided to the converter corresponding to the connected port.

If two or more ports are connected, only one port having a higher priority according to the priority setting is selected. The priority setting is read in operation S906. The priority is set, for example, as USB->IEEE1394->RS232C-> .... Based on the read priority setting, the port having the higher priority is selected in operation S908. The power that is provided to converters corresponding to the ports not selected is cut off in operation S910. Using the selected port, the peripheral is operated in operation S912.

Those skilled in the art easily understand that the hard disc drive interface device and the priority control method described as embodiments of the present invention are easily applied to a portable hard disc drive. Also, those skilled in the art easily understand that the hard disc drive interface device and the priority control method described above are easily applied to not only hard disc drives, but also to other peripherals, such as an optical disk drive, a cassette tape recorder/player, a digital camera, a digital camcorder, a computer, a peripheral device connectable to the computer, etc., without significant modification.

Therefore, the present invention is not restricted to the above-described embodiments and many variations are possible within the spirit and scope of the present invention.

As described above, the peripheral interface device and priority control method according to the present invention can support multiple interface methods so that expandability of peripherals is obtained.

Also, the peripheral interface device and priority control method according to the present invention, when applied to a portable hard disc drive, enables a reduction in the size of the portable hard disc drive and provides stable operation.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hard disc interface device, comprising:
a plurality of ports which receive respective first signals appropriate to a plurality of respective first interface methods;
a plurality of interface converters which are connected to respective ports, of the plurality of ports, and convert the respective first signals of the respective first interface methods into respective second signals of a second interface method appropriate to the hard disc drive, the interface converters including converters each corresponding to one of an IEEE 1394 bus and a USB bus;
a priority determining unit which identifies at least one of the first interface methods corresponding to respective ports such that when at least two ports are connected to external interfaces a priority among the respective interface converters for the at least two ports is determined in response to the identification of the at least one of the first interface methods and a predetermined priority setting between the at least two ports, wherein the priority setting has at least three levels of priority for assigning priority between at least three respective ports;
a port selection unit to selectively control supply of power to the interface converters based upon the priority determination of the priority determining unit, wherein the port selection unit controls the supply of the power provided to the interface converters appropriate to the IEEE 1394 bus and the USB bus in response to a USB power signal of the USB bus; and
a connection unit connected to the interface converters to transmit and receive the second signals of the second interface method appropriate to the hard disc drive.

2. The hard disc interface device of claim 1, wherein the ports comprises a USB port, and the port selection unit comprises:
a buffer which generates an enable signal (ENB) indicating whether the USB port is connected to one of the interfaces, and an inversed enable signal ($\overline{ENB}$) having an inverse logic state of the enable signal according to a state of the USB power signal.

3. The hard disc interface device of claim 1, wherein the port selection unit controls the power provided to the interface converters appropriate to the IEEE1394 bus and the USB bus in response to an IEEE1394 power signal of the IEEE1394 bus.

4. A peripheral interface device, comprising:
a plurality of ports, each of which supports at least one interface method;
a plurality of interface converters which are connected to respective ports and convert first signals of interface methods corresponding to the ports into second signals of a second interface method appropriate to the peripheral device, the plurality of interface converters comprising converters that each correspond to one of an IEEE 1394 bus and a USB bus;
a priority determining unit to receive the first signals of the respective interface methods from the ports, and when the two or more interfaces are connected, determine a priority among the interface converters based on a predetermined priority setting between at least two ports, wherein the priority setting has at least three levels of priority for assigning priority between at least three respective ports;
a port selection unit to, according to a result of priority determination by the priority determining unit, selectively control a supply of power in order to selectively operate one of the interface converters, wherein the port selection unit controls the power provided to the interface converters corresponding to the IEEE 1394 bus and the USB bus, respectively, in response to a USB power signal of the USB bus; and
a connection unit connected to the interface converters to transmit and receive the second signals of the second interface method appropriate to the peripheral device.

5. The peripheral interface device of claim 4, the ports comprises a USB port, and the port selection unit comprises:
a buffer which generates an enable signal (ENB) indicating that a USB port is connected, and an inverse enable signal ($\overline{ENB}$) having an inverse logic state of the enable signal, according to a state of the USB power signal of the USB bus.

6. The peripheral interface device of claim 4, wherein the port selection unit in response to an IEEE1394 signal of the IEEE1394 bus, controls the power provided to the converters corresponding to the IEEE1394 bus and the USB bus.

* * * * *

UNITED STATES PATENT AND TRADEMARK OFFICE
CERTIFICATE OF CORRECTION

PATENT NO. : 7,516,345 B2  Page 1 of 1
APPLICATION NO. : 10/460169
DATED : April 7, 2009
INVENTOR(S) : Ho-joong Choi et al.

It is certified that error appears in the above-identified patent and that said Letters Patent is hereby corrected as shown below:

Column 8, Line 27, after "converters" delete "which are".

Column 8, Line 28, after "ports" change "and" to --to--.

Column 8, Line 36, before "two" delete "the".

Signed and Sealed this

Thirtieth Day of June, 2009

JOHN DOLL
*Acting Director of the United States Patent and Trademark Office*